US012634475B2

(12) United States Patent
Adzic et al.

(10) Patent No.: US 12,634,475 B2
(45) Date of Patent: May 19, 2026

(54) SYSTEMS, METHODS AND BITSTREAM STRUCTURE FOR HYBRID FEATURE VIDEO BITSTREAM AND DECODER

(71) Applicant: OP Solutions, LLC, Amherst, MA (US)

(72) Inventors: Velibor Adzic, Canton, GA (US);
Borivoje Furht, Boca Raton, FL (US);
Hari Kalva, Boca Raton, FL (US)

(73) Assignee: OP Solutions, LLC, Amherst, MA (US)

( * ) Notice: Subject to any disclaimer, the term of this patent is extended or adjusted under 35 U.S.C. 154(b) by 149 days.

(21) Appl. No.: 18/380,316

(22) Filed: Oct. 16, 2023

(65) Prior Publication Data

US 2024/0114147 A1 Apr. 4, 2024

Related U.S. Application Data

(63) Continuation of application No. PCT/US2022/025584, filed on Apr. 20, 2022.

(Continued)

(51) Int. Cl.
*H04N 19/157* (2014.01)
*H04N 19/103* (2014.01)
(Continued)

(52) U.S. Cl.
CPC ......... *H04N 19/157* (2014.11); *H04N 19/103* (2014.11); *H04N 19/119* (2014.11); *H04N 19/136* (2014.11); *H04N 19/184* (2014.11)

(58) Field of Classification Search
CPC .. H04N 19/103; H04N 19/119; H04N 19/136; H04N 19/157; H04N 19/17;
(Continued)

(56) References Cited

U.S. PATENT DOCUMENTS

2006/0173675 A1 8/2006 Ojanpera
2014/0058737 A1 2/2014 Ishikawa et al.
(Continued)

FOREIGN PATENT DOCUMENTS

WO 2012034690 A1 3/2012

OTHER PUBLICATIONS

"A Bitstream Feature Based Model for Video Decoding Energy Estimation"—Herglotz et al., 2016 Picture Coding Symposium (PCS); 978-1-5090-5966-9/16/$31.00 Â© 2016 IEEE (Year: 2016).*
(Continued)

*Primary Examiner* — Mainul Hasan
(74) *Attorney, Agent, or Firm* — OP Solutions IP Department; Paul Ackerman

(57) ABSTRACT

Methods and systems for hybrid feature video bitstream encoding and decoding are provided. Encoding can be performed in one of a plurality of modes. In one mode, the video components of the encoded bitstream include residual data generated encoding the difference between feature data and input video data. A compatible decoder can operate in a plurality of decoding modes. In one decoding mode, the video components are decoded using the encoded video and encoded feature data in the bitstream. The hybrid bitstream between the encoder and decoder is formed with a plurality of hybrid segments, each having a plurality of components specifying characteristics the feature and video content of the segment.

7 Claims, 8 Drawing Sheets

100

Related U.S. Application Data

(60) Provisional application No. 63/178,352, filed on Apr. 22, 2021.

(51) Int. Cl.

| | | |
|---|---|---|
| *H04N 19/119* | (2014.01) | |
| *H04N 19/136* | (2014.01) | |
| *H04N 19/184* | (2014.01) | |

(58) Field of Classification Search
CPC ...... H04N 19/184; H04N 19/20; H04N 19/30; H04N 19/46; H04N 19/70; H04N 19/85
See application file for complete search history.

(56) References Cited

U.S. PATENT DOCUMENTS

| | | | | |
|---|---|---|---|---|
| 2017/0318297 | A1* | 11/2017 | Puri | ..................... H04N 19/167 |
| 2019/0261011 | A1 | 8/2019 | Hannuksela | |
| 2019/0394485 | A1* | 12/2019 | Tsai | ..................... H04N 19/436 |
| 2020/0304797 | A1 | 9/2020 | Zhao et al. | |
| 2021/0203997 | A1* | 7/2021 | Veselov | ............... G06V 10/454 |
| 2023/0362378 | A1* | 11/2023 | Ma | ......................... H04N 19/23 |
| 2024/0380929 | A1* | 11/2024 | Begaint | .................. G06V 10/82 |

OTHER PUBLICATIONS

"Efficient Multiplexing Scheme of Stereoscopic Video Sequences for Digital Broadcasting Services," ETRI Journal, Dec. 2010.

Written opinion and search report for PCT/US2022/025584.

Search Report in corresponding EP application 229246.3 dated Mar. 4, 2025.

"Video Coding for Machines: A Paradign of Collaborative Compression and Intelligent Analaytics," Duan et al., IEEE Transactions on Image Processing, vol. 29, pp. 8680-8695, Aug. 28, 2020.

ISO/IEC JTC/SC29/WG11 N 19506, "Use cases and requirements for Video Coding for Machines," Jun. 2020.

* cited by examiner

DECODING PROCESS

SYSTEMS, METHODS AND BITSTREAM STRUCTURE FOR HYBRID FEATURE VIDEO BITSTREAM AND DECODER

STATEMENT OF RELATED CASES

This application is a continuation of international application PCT/US2022/025584 filed on Apr. 20, 2022, and entitled SYSTEMS, METHODS AND BITSTREAM STRUCTURE FOR HYBRID FEATURE VIDEO BIT-STREAM AND DECODER, which claims priority to U.S. Provisional Application 63/178,352, filed on Apr. 22, 2021 and entitled METHODS AND SYSTEMS FOR HYBRID FEATURE VIDEO BITSTREAM AND DECODER, the disclosures of each of which are hereby incorporated by reference in their entireties.

FIELD OF THE DISCLOSURE

The present invention generally relates to the field of video compression. In particular, the present invention is directed to methods and systems for hybrid feature video bitstream and decoder.

BACKGROUND

Although video has been typically thought of as media for human consumption, there are growing applications for the use of video in machine applications, such as advanced industrial processes, autonomous vehicles, IoT applications and the like. These applications are expected to continue to grow and continue to place increasing demands on video channel bandwidth. In some applications, it will be desirable to provide video content which is optimized for both human and machine consumption. Such a bitstream may be referred to as a hybrid bitstream. The utility of the proposed bitstream and decoder is primarily for scenarios where bitstream is transmitted to both human viewers and machines that analyze visual data. The video portion of the bitstream is intended for human viewers, the feature portion of the bitstream is intended for analysis by machines It will be beneficial, therefore, to develop systems and methods that can compress, encode and efficiently transmit video content suitable for both human and machine applications.

Proliferation of edge devices and increase in automatic video analysis in conjunction with technologies and concepts such as 5G and IoT has brought forward a need for the standard for video coding which considers machines as end users.

Current state-of-the-art approach is to record, encode, and send to server all signals from the edge device. On the server the bitstream of signals is decoded and passed to the machine algorithms for analysis and processing. Examples of this approach can be found in the popular devices such as Amazon's Echo with Alexa, Google's Home with Assistant, and Apple's devices with Siri, among others. Since these devices process mainly sound (audio signal), the payload is not too large.

However, for the devices that process video, such as Ring® doorbell, the requirements for network bandwidth and availability are very high. To mitigate these prohibitive requirements another approach is proposed: the device itself should conduct some of the early stages of processing and send only compressed features to the server. This way the payload is significantly reduced at the expense of computational complexity on the edge. The tradeoff between reduced payload (low network usage) and computational complexity (high battery usage) can be addressed by adaptive delegation. Processing can be done by the edge device entirely, delegated between edge device and the server, or done entirely on the server A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

SUMMARY OF THE DISCLOSURE

In one embodiment, a hybrid decoder for a video bitstream supporting a video component and a feature component is provided. The hybrid decoder includes a demultiplexer which receives a bit stream and parses the received bitstream into video components and feature components. A video decoder is coupled to the demultiplexer and receives the video components of the bitstream. A feature decoder is also coupled to the demultiplexer and receives the feature components of the bitstream. Preferably, the feature decoder is also coupled to the video decoder and selectively provides feature data thereto to facilitate video decoding. A machine model is coupled to the feature decoder. The hybrid decoder preferably has at least a first decoding mode for independently decoding the video components and feature components of the bitstream and a second decoding mode for decoding video components in the bitstream using, in part, feature components in the bitstream.

In some embodiments, the video components in the bitstream comprise residual data obtained by encoding the difference between feature data and input video data, and the feature decoder provides feature data to the video decoder in the second decoding mode.

In some exemplary embodiments, the decoding mode is determined by the decoder based on attributes of the bitstream.

Preferably, the hybrid bitstream comprises a plurality of segments, each segment comprising a plurality of components defining the feature and video components therein. This can include a hybrid size component and the decoding mode can be determined at least in part by characteristics of the hybrid size component. In certain embodiments, each segment is separately decoded and the decoding mode is determined for each segment.

The present disclosure also provides a bitstream structure for encoded hybrid video data having feature components and video components. The bitstream preferably includes a plurality of hybrid bitstream segments, with each bitstream segment comprising a plurality of components. Exemplary components may include: a hybrid size component; a metadata component; a feature header; a feature payload; a video header; and a video payload.

The present disclosure also provides a hybrid encoder for generating a hybrid bitstream. One embodiment of a hybrid encoder includes a preprocessor receiving an input video stream and multiplexes the video stream for both video processing and feature processing. A video encoder is provided for compressing and encoding the video content for human viewing for inclusion in the bitstream. A feature extractor is also provided. The feature extractor is coupled to a machine model which provides parameters for feature extraction for subsequent machine processing. The feature extractor is preferably operatively coupled to the video encoder and selectively provides feature data thereto. A feature encoder receives feature data from the feature extractor and encodes the feature data for inclusion in a hybrid bitstream. A multiplexer is coupled to the video encoder and feature encoder and generates a hybrid bitstream therefrom.

In some exemplary embodiments the hybrid encoder operates in at least a first encoding mode for independently encoding the video components and feature components of the bitstream and a second encoding mode for encoding the video components in the bitstream using, in part, feature components from the feature encoder. In one further example, in the second encoding mode, the video encoder generates residual data by encoding the difference between feature data and input video data.

The hybrid encoder preferably generates a hybrid bitstream that comprises plurality of hybrid bitstream segments. In one example, each bitstream segment includes a plurality of components. An exemplary set of components may include: a hybrid size component; a metadata component; a feature header; a feature payload; a video header; and a video payload.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

The present disclosure is directed to systems and methods for hybrid video data encoding and decoding. The process of coding video for use in machine processes is often referred to as video coding for machines or VCM.

Figure 1:
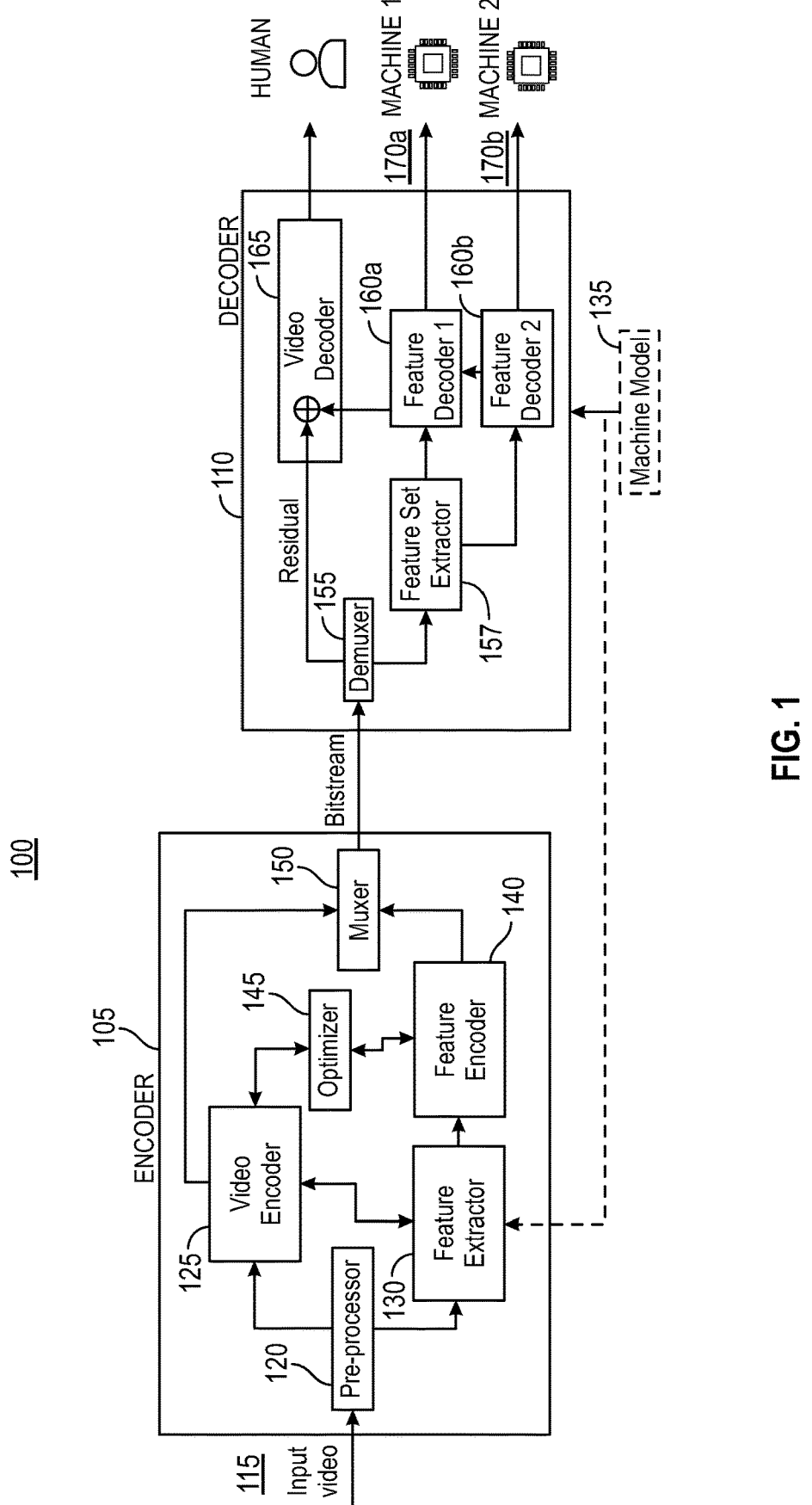
FIG. 1 is a simplified block diagram of an exemplary embodiment of an encoder and decoder suitable for use in hybrid video applications.

FIG. 1 is a simplified block diagram illustrating a conceptual architecture of the VCM system for hybrid video data includes an encoder 105 and decoder 110. As can be seen in FIG. 1, input to the encoder is a video stream 115, usually in the form of a raw video, such as from a camera or other video generation system. Encoder 105 outputs a bitstream which is subsequently sent to the decoder, which decodes it into an output that is consumed by humans and/or machines. VCM Encoder 105 receives the input video 115 and passes it through a pre-processor/video splitter 120. The pre-processor 120 splits the received video data stream into two components: a video component that is passed to video encoder (e.g., a RGB to YUV conversion), and a stream that is passed to the feature extractor 130. The stream that is passed to the feature extractor 130 is converted to an appropriate format if needed. It can also be quantized or in some other way down-sampled as needed by the feature extractor 130.

The video encoder 125 is preferably configured to compresses/encode the video stream in two available modes, a "basic mode" and a "feature-compensated mode". When operating in the "basic mode" the video encoder 125 is operating as a standard video encoder, such as a standard compliant decoder for H.264, HEVC, AVC, VVC video coding standards, with optional addition of a two-way connection with the feature extractor 130. In this mode video sub-stream is decodable by any decoder which is compliant with a given standard of the bitstream. This connection from the video encoder 125 to the feature extractor 130 may be used to provide additional information that can be used for more efficient compression, especially in the perceptual domain. The video encoder 125, on the other hand, can provide useful feedback to the feature extractor 130, such as motion information, scene change information, etc.

In the "feature-compensated mode" the video encoder 125 preferably receives both the input video and the feature extractor feedback. Based on the feature maps it estimates and encodes the residual difference between the maps and the input picture.

Feature-compensated mode (FCM) is a video encoding/decoding mode in which the video sub-stream is comprised of the residual data, obtained by the encoding of the difference between feature data and input video data. During decoding, this residual can be combined with the baseline feature data. Baseline feature data can be obtained by the video decoder from the feature decoder. Baseline feature data can be equal to the unmodified output of the feature decoder, or it can be a subset of the output of the feature decoder. Baseline residual data can be composed of any of the features, or combination of the features and the input video signal. For example, baseline feature data can be composed of the feature maps that result when the input video data is passed through one or more layers of the Convolutional Neural network (CNN). It can also be composed of the visual primitives composed of the features, such as edges, corners or the key points.

The feature extractor 130 converts input pixel stream from the pre-processor 120 into the feature space for machine use. This feature space corresponds with the task that is to be completed by the machine. Some examples of the conversions include the following: edge extraction—using the computer vision algorithm such as Canny edge detection to detect and then extract relevant edges in the input picture; keypoint extraction—using the algorithms such as Scale-Invariant Feature Transform and Speeded Up Robust Features; signal extraction—using the independent component analysis or principal component analysis to extract the most relevant components of the spectrum from the input picture or audio; feature map extraction—using the lower layers of the neural network, such as the Convolutional Neural network, etc. The type of conversion is selected based on the machine model input 135. The copy of the machine model 135 can be stored on the edge device either independently or as a part of an encoder 105. This allows both scalable deployment of the configurable encoder software and the offline operational mode when the network connection to the terminal machine is not available. This input is provided either by the terminal machine in real-time, or from the local storage. Additionally, the feature extractor 130 can take feedback input from the video encoder 125 that optimizes processing The feature encoder 140 receives the extracted features from the feature extractor 130 and compresses them via standard lossless and lossy techniques that are developed for similar standards (CDVA for example). Although any known methods may be uses, it is preferred that the feature encoder employs mainly a type of entropy coding. An optimizer 145 may be provided to receive inputs from both the video encoder 125 and the feature encoder 140 and provide signals to these respective blocks indicating the presence of overlaps and redundancies in the data that can be further compressed or discarded in the video and/or feature bitstreams. The outputs of the video encoder 125 and feature encoder 140 are provided to a multiplexer, or muxer 150 which combines the two bitstreams into one.

The hybrid decoder 110 receives the encoded hybrid bitstream and passes it to a demultiplexer, or demuxer 155. Demuxer 155 splits the received hybrid bitstream into video and feature bitstreams, in what is essentially a complimentary operation to that of muxer 150. The feature bitstream is then provided to one or more feature decoders 160a, 160b. In the case where multiple different feature sets are used, a feature set extractor 157 may be interposed between the demux 155 and feature decoders to separate individual feature sets from the bitstream and pass them on to the respective feature decoders 160a, 160b. Each feature decoder 160 receives input from the machine model 135 and an individual feature set as an input and decodes it. The machine model 135 can be provided as an input from a remote source or can be included in storage in the decoder 110. In addition, in the "feature-compensated mode" the feature decoder 160 sends specific subset of features to the video decoder 165. The output of the feature decoder 160 is sent to the terminal machine 170. Video decoder 165 is preferably a standard video decoder in the "basic mode", and a hybrid decoder in the "feature-compensated mode" (with a possibility of using basic mode for both).

Figure 2:
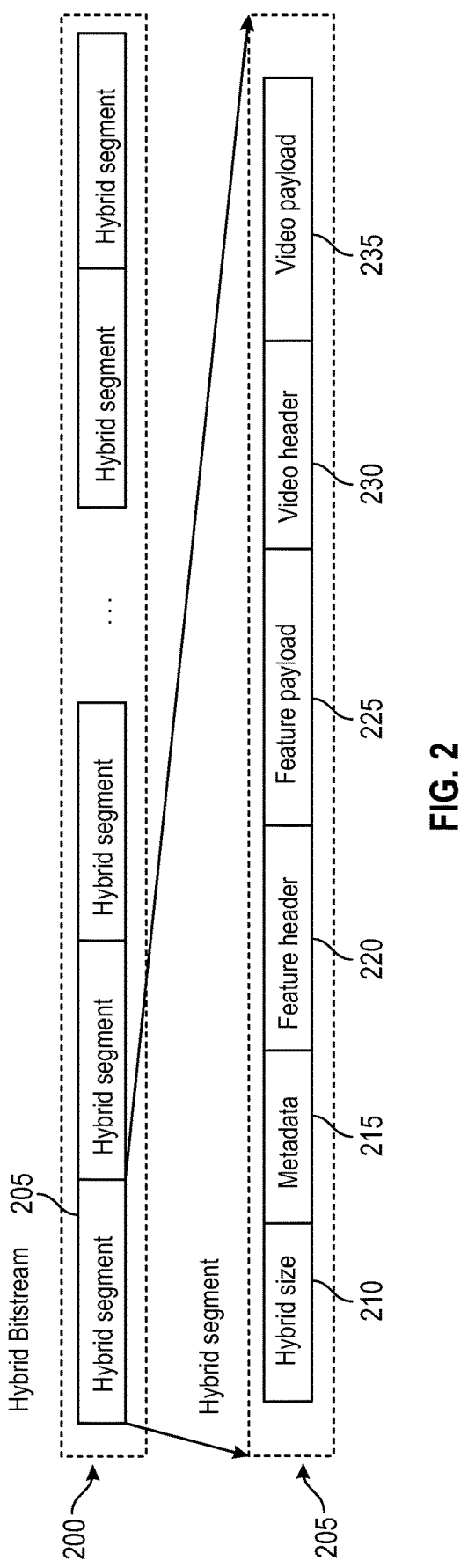
FIG. 2 is an illustration of an exemplary embodiment of a hybrid bitstream structure.

FIG. 2 is a simplified schematic diagram of a bitstream containing both video and features that is output from encoder 105 and transmitted to decoder 110 via a transmission channel. Because the bitstream includes both video and features it is designated as a hybrid bitstream. The top row 200 represents a hybrid bitstream which is a continuous stream comprised of individual units called hybrid segments 205. A sequence of hybrid segments 205 are temporally sequential parts of the continuous stream. Each hybrid segment 205 is preferably further comprised of six components, hybrid size 210, metadata 215, feature header 220, feature payload 225, video header 230 and video payload 235. The components can generally appear in any order, as long as hybrid size 210 is the first component in the hybrid segment 205. In one example, the component order can be implicitly signaled by using "type" and "size" fields in individual components. Alternatively, components 210-235 can contain the "start code" field, which replaces "size" and "type" fields and is instead used for sequential parsing by the decoder. Fields inside the components can be interpreted by the decoder to initialize or update the parameters for decoding.

The hybrid size component 210 is preferably a single field array of numbers that specify the length of each of the components in the sequence. This can be expressed in standard units (usually bits or bytes). As an example, [10, 30, 500, 100, 5000] could mean that there is 10 bytes of metadata information, followed by 30 bytes of feature header data, followed by 500 bytes of feature payload, followed by 100 bytes of video header data, followed by 5000 bytes of video payload. These numbers can be used by the decoder to extract relevant portions of the input bitstream that belong to current segment. If any of the feature or video components are not present, this is signaled by the 0 values in the array.

In the alternative decoding scenario, "start code" is used to mark beginning of the new component of the type that is specified by that "start code".

The metadata component 215 contains fields that describe segment content, for example, but not limited to:

Input resolution of the video. This may be represented as pixel values of width and height.

Start segment: A binary flag that is set to 1 if the segment is first in the independently decodable sequence of segments and is set to 0 otherwise.

Feature-compensated mode: A binary flag that is set to 1 if the current segment is encoded in the FC mode and is set to 0 otherwise.

Custom fields reserved for future extensions.

The feature header component 220, generally contains fields that describe segment content related to feature, for example, but not limited to:

Scaling factor for resolution change. A single number that represents multiplier of the input video resolution.

Feature type: an index number that designates type of the features present in the payload. For example: (1—edges, 2—key points, 3—neural network, etc.)

Feature type configuration: optional set of fields that carry information about the feature type. For example, a topology of the neural network.

ROI coordinates: array of quartets that designate (implicitly) presence and explicitly locations of regions of interest (ROIs), such as bounding boxes around objects of interest. Each quartet contains numbers designating following pixel values (x-coordinate of the top left corner of the ROI, y-coordinate of the top left corner of the ROI, ROI width, ROI height). For example [(100, 50, 200, 250), (400, 400, 200, 300)], designates two ROIs.

Residual: A flag that designates if the current segment feature payload is used by the video decoder in the FC mode.

Various parameter sets related to the specific feature type.

Custom fields reserved for future extensions.

The feature payload component 225 is the portion of the bitstream that contains encoded feature data needed for the reconstruction of the output features. Feature data can include, for example, key points, edges, motion information, object detections, bounding boxes, feature maps of the neural networks, and similar data that enables image and video analytics applications such as event and action recognition, object detection and tracking, pose estimation, etc. Features may be encoded using entropy and binary coding such as Huffman coding, Arithmetic coding or VLC coding, etc.

The video header component 230 generally contains fields that describe segment content related to video, for example, but not limited to:

Mode: A single number (bit) reserved for signaling Basic or FC mode for the current video segment.

Parameter sets: for example, a picture parameter set that signals configuration of the video decoder. Possibly sequence parameter set also.

Quantization matrices: a set of one or more matrices that carry quantization coefficients used for decoding. Each matrix is identified with the region to which it is applied. Region location can be signaled explicitly or obtained from the feature decoder (as ROI coordinates), together with the residual information, or independently.

Perceptual parameters: quantization scaling and loop filter parameters that are applied in the regions with perceptually significant characteristics (obtained from the feature decoder as ROI regions).

Custom fields reserved for future extensions.

The video payload 235 is the portion of the bitstream that contains encoded video data needed for the reconstruction of the output features.

Figure 3:
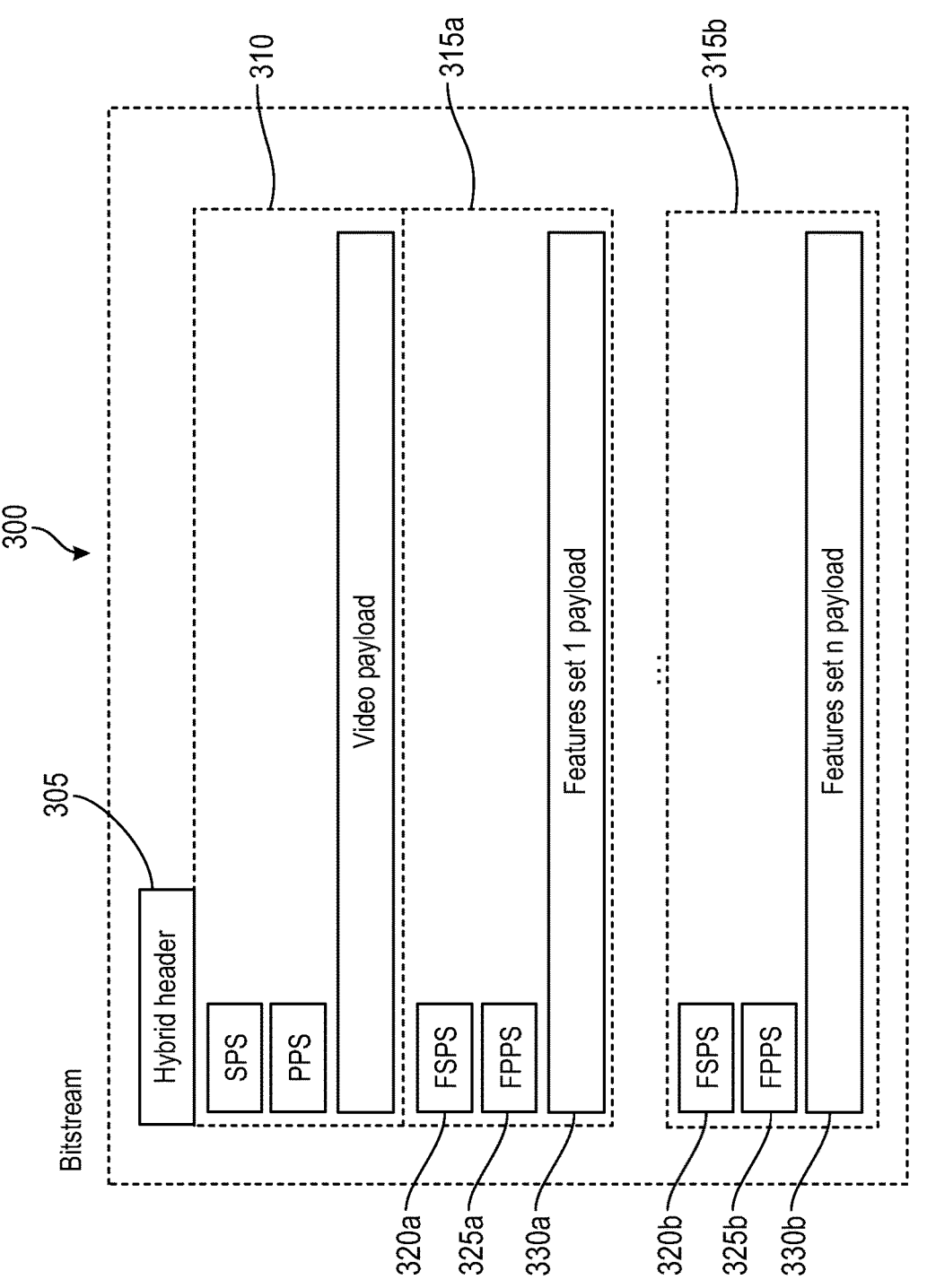
FIG. 3 is an illustration of an exemplary embodiment of a hybrid bitstream structure.

FIG. 3 further illustrates an exemplary hybrid bitstream structure 300. The bitstream includes a hybrid header 305 which contains, for example, a list of zero or one video streams 310 and zero or more feature streams 315a, 315b. The hybrid header 305 preferably contains relevant high-level parameters (used for stream splitting, etc.) and may also contain parameters that signals which mode is used for encoding, i.e., "basic" or "feature-compensated". Video stream 310 preferably has a standard structure defined in one or more known video coding standards, such as a sequence parameter set (SPS), picture parameter set (PPS), etc. The video stream can be decoded by either VCM or VVC decoder, depending on which mode is used for encoding. Each feature stream 315a, 315b, preferably contains header information, such as a feature sequence parameter set FSPS 320a, 320b and feature picture parameter set FPPS 325a, 325b and a corresponding feature payload 330a, 330b.

Figure 4:
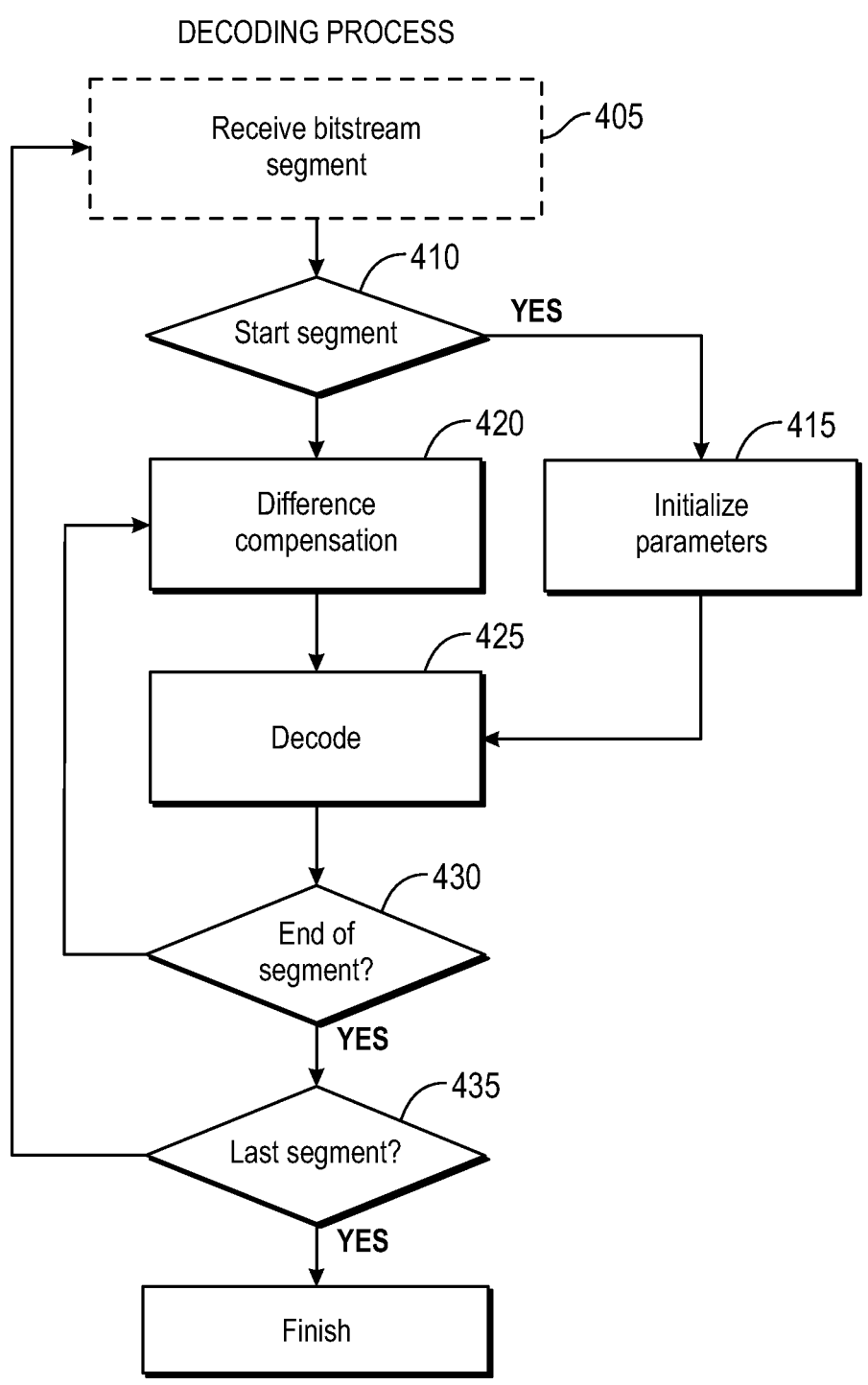
FIG. 4 is a flow diagram illustration of an exemplary embodiment of a decoding process for a hybrid bitstream.

The overview of the decoding process for a hybrid bitstream is described in connection with the flow chart of FIG. 4. The decoder 110 receives a bitstream segment 205 in step 405, reads the metadata 215 and in step 410 determines if the current segment is start segment in a sequence of segments. If it is a start segment, the decoding process advances to step 415 and sets the decoding parameters according to the values in the other fields in the metadata component 215 and the values of the fields in the feature header 220 and video header 230. If the received segment is not the first segment in step 410, the decoding process proceeds with difference compensation calculations in step 420 between the current segment and previous segments. Difference compensation calculations may include motion compensation, or any other type of compensation appropriate for the feature sets. Following steps 415 and 420, processing proceeds to decode the payload data in step 425. The payload data is tested in step 430 to determine if processing has reached the end of the segment. If the end of the segment is not reached in Step 430, processing returns to step 420. If the segment is a last segment in the sequence of segments it finishes the decoding of the current group of segments. In step 435 the decoder determines whether the last segment has been decoded. If not, processing returns to step 405 to decode the next segment.

Each group of segments is a sequence of one or more consecutive segments. Each group of segments is independently decodable. Video segments within one group of segments are independently decodable in relation to other video segments but might depend on the feature segments from the same group of segments.

In each hybrid segment or group of segments in the hybrid bitstream there might be one or zero feature segments and one or zero video segments. The presence of the feature and video segments can be determined implicitly from the values of the "hybrid size" component 210. The mode of the decoder can be determined based on a "feature-compensated mode" (FCM) flag for each segment.

Figure 5:
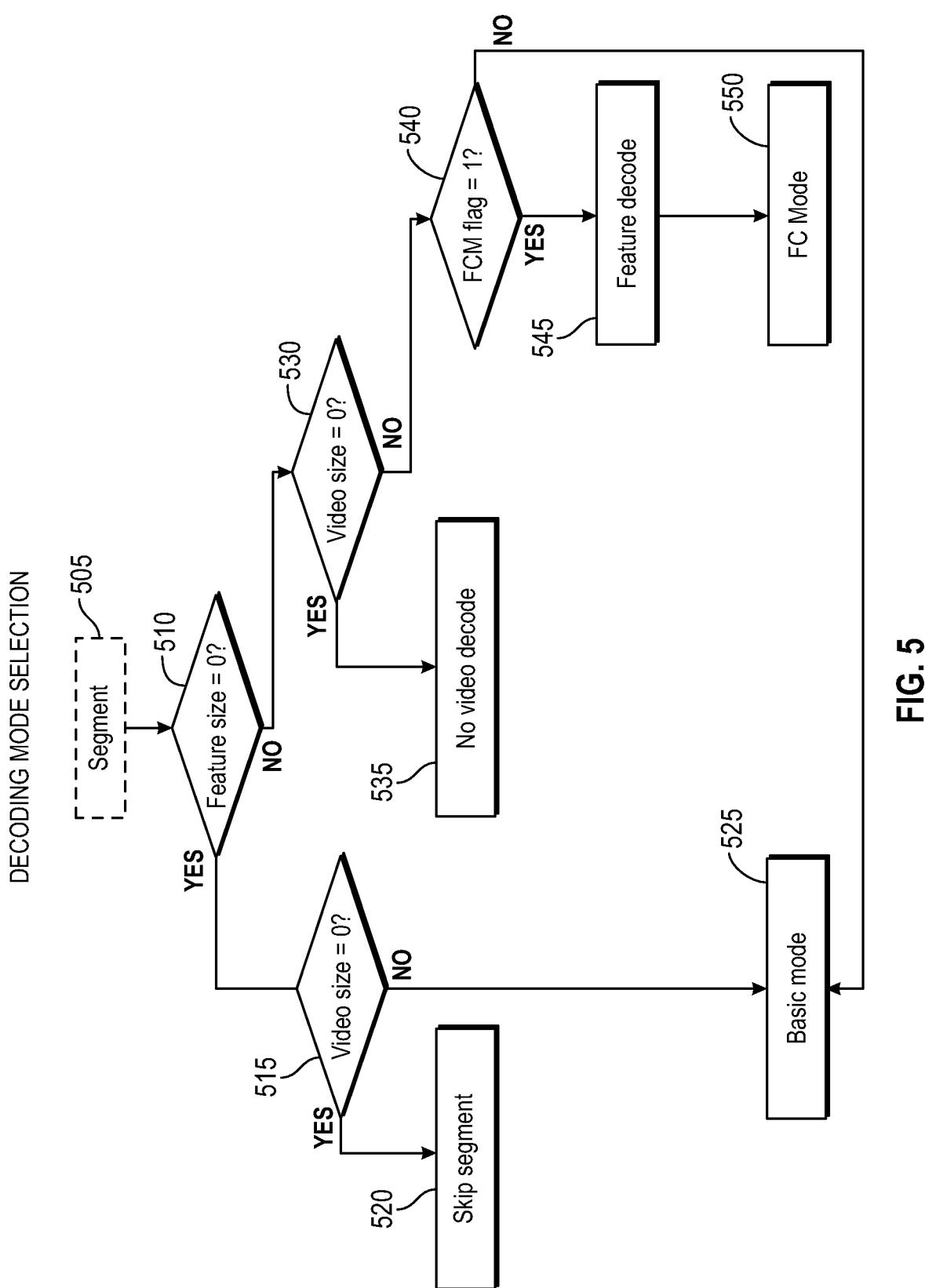
FIG. 5 is a flow diagram illustrating a decoding mode selection suitable for use in exemplary embodiments of the current decoding processes.

Decoding mode selection using the decision process for the parsing of the FCM flag together with the parsing of the size parameters for segment presence determination is further described in connection with the flow chart depicted in FIG. 5.

Decoder receives the hybrid segment in step 505 and in step 510 determines if the feature segment is present by evaluating the feature size. If feature segment is not present (size of it is 0), the decoding process checks the size in step 515 to determine if a video segment is present. If it is not (size of it is 0), the current segment is skipped (step 520). If the video segment is present in step 515 after determining that no feature segment was present in the segment in step 510, the mode is set to "Basic mode" in step 525, and only video is decoded.

If in step 510, the feature segment is present (feature size is not 0), and video segment is not (video size=0) (step 30), then there is no video decoding, only the features are decoded (step 535). If both feature and video segments are present, in step 540 the decoder checks the FCM flag from the metadata component 215. If the FCM mode is signaled (FCM=1), then the feature segment is first decoded (step 545) and baseline feature data is passed to the video decoder that operates in the FC mode (step 550), thus combining baseline feature data with the residual to obtain the video output. If in step 540 the FCM flag is set to 0, the feature segment and video segments are decoded independently, and the video decoder operates in the "Basic mode".

Figure 6:
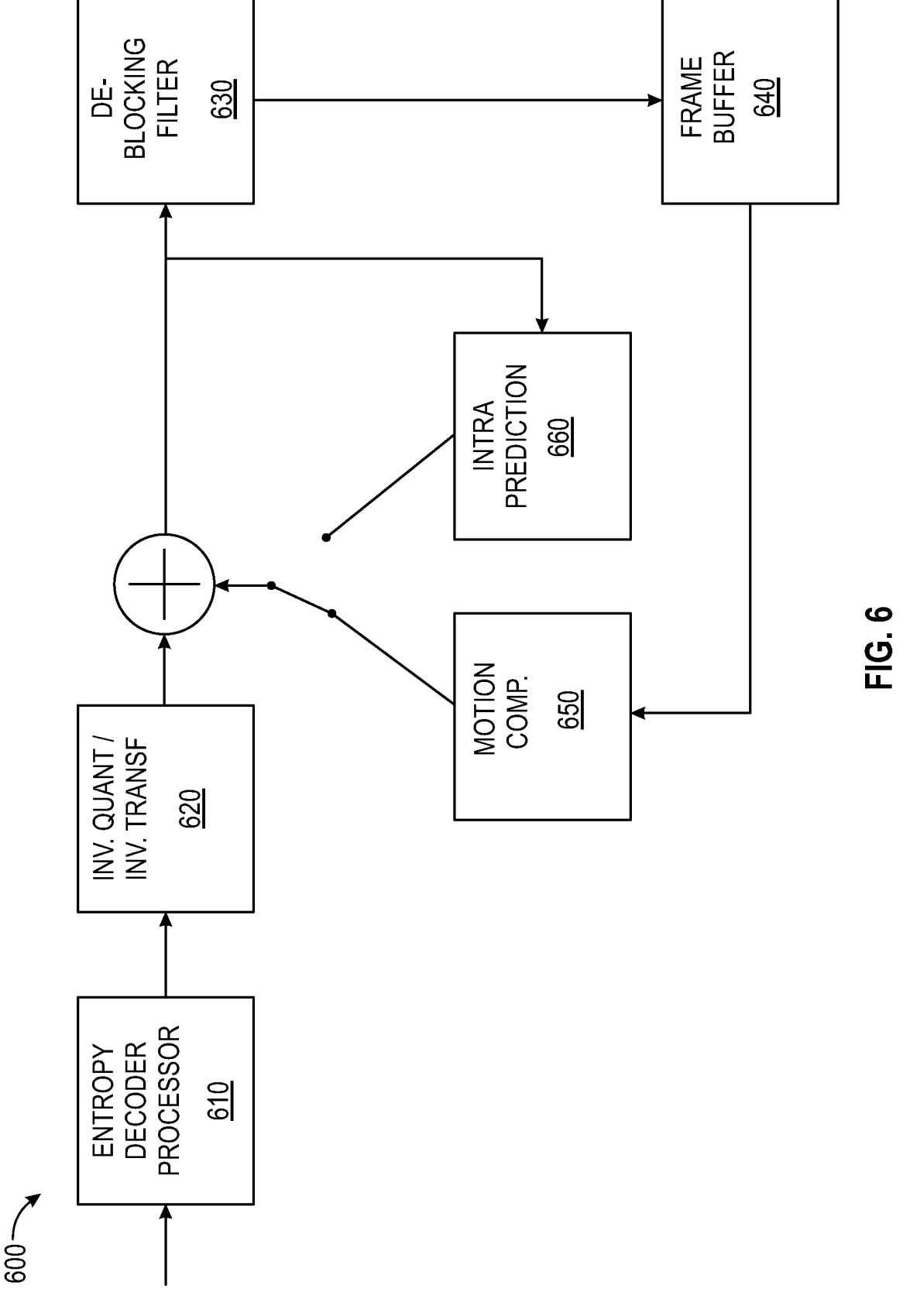
FIG. 6 is a simplified block diagram of an exemplary embodiment of a video decoder.

FIG. 6 is a system block diagram illustrating an example video decoder 600, such as shown as video decoder 165 in FIG. 1, capable of decoding the video portion of a hybrid bit stream. The decoder 600 includes an entropy decoder processor 610, an inverse quantization and inverse transformation processor 620, a deblocking filter 630, a frame buffer 640, motion compensation processor 650 and intra prediction processor 660.

In operation, video portion of the hybrid bit stream can be received by the decoder 600 and input to entropy decoder processor 610, which entropy decodes portions of the bit stream into quantized coefficients. The quantized coefficients can be provided to inverse quantization and inverse transformation processor 620, which can perform inverse quantization and inverse transformation to create a residual signal, which can be added to the output of motion compensation processor 650 or intra prediction processor 660 according to the processing mode. The output of the motion compensation processor 650 and intra prediction processor 660 can include a block prediction based on a previously decoded block. The sum of the prediction and residual can be processed by deblocking filter 630 and stored in a frame buffer 640.

In an embodiment, and still referring to FIG. 6 decoder 600 may include circuitry configured to implement any operations as described above in any embodiment as described above, in any order and with any degree of repetition. For instance, decoder 600 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
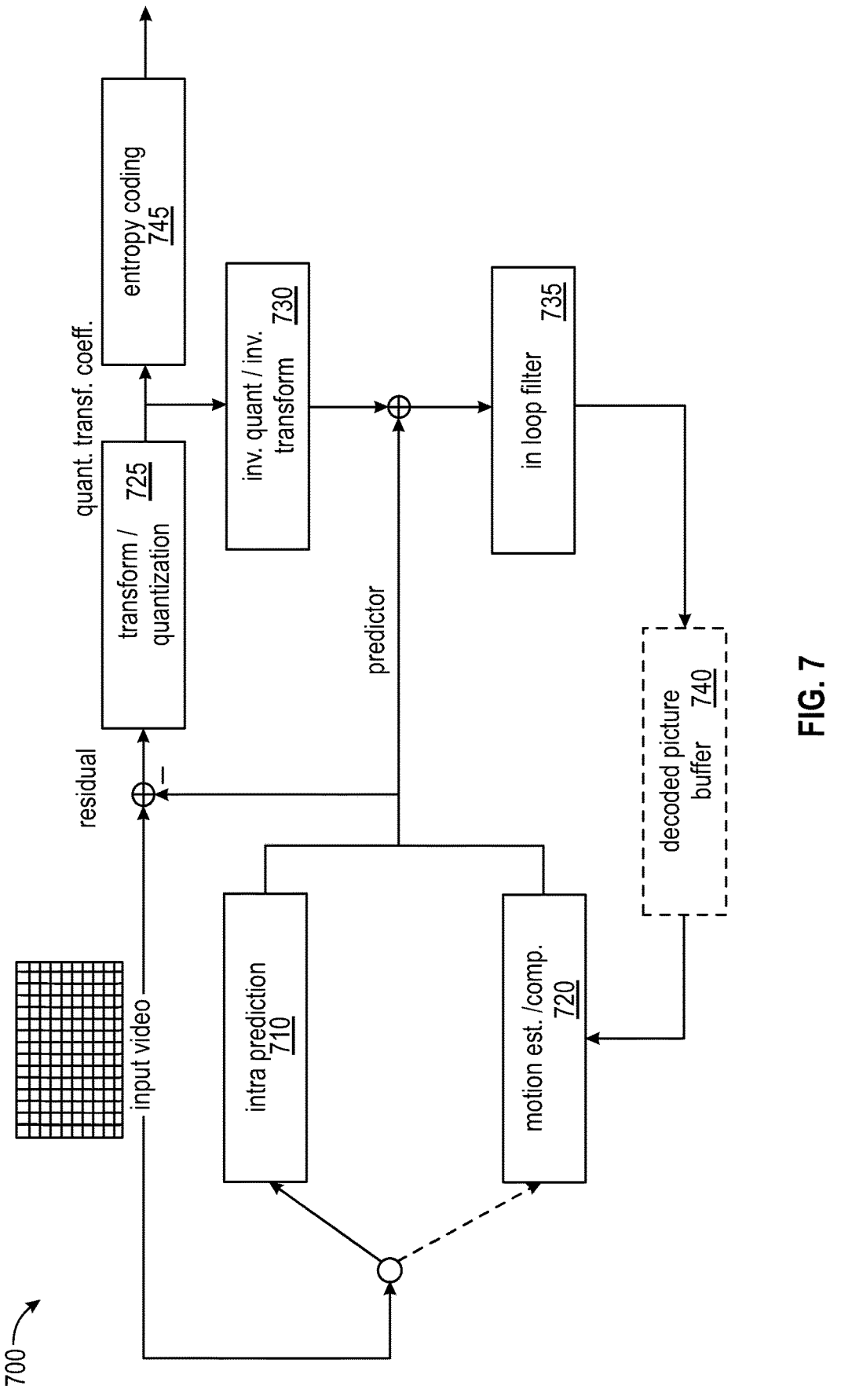
FIG. 7 is a simplified block diagram of an exemplary embodiment of a video encoder.

FIG. 7 is a system block diagram illustrating an example video encoder 700 suitable for encoding the video portion of a hybrid bitstream, such as video encoder 125 shown in FIG. 1. The example video encoder 700 receives an input video 705, which can be initially segmented or dividing according to a processing scheme, such as a tree-structured macro block partitioning scheme (e.g., quad-tree plus binary tree). An example of a tree-structured macro block partitioning scheme can include partitioning a picture frame into large block elements called coding tree units (CTU). In some implementations, each CTU can be further partitioned one or more times into a number of sub-blocks called coding units (CU). The final result of this portioning can include a group of sub-blocks that can be called predictive units (PU). Transform units (TU) can also be utilized.

Still referring to FIG. 7, example video encoder 700 includes an intra prediction processor 715, a motion estimation/compensation processor 720 (also referred to as an inter-prediction processor) capable of supporting adaptive cropping, a transform/quantization processor 725, an inverse quantization/inverse transform processor 730, an in-loop filter 735, a decoded picture buffer 740, and an entropy coding processor 745. Bit stream parameters can be input to the entropy coding processor 745 for inclusion in the output bit stream 750.

In operation, and continuing to refer to FIG. 7, for each block of a frame of the input video 705, whether to process the block via intra picture prediction or using motion estimation/compensation can be determined. The block can be provided to the intra prediction processor 710 or the motion estimation/compensation processor 720. If the block is to be processed via intra prediction, the intra prediction processor 710 can perform the processing to output the predictor. If the block is to be processed via motion estimation/compensation, the motion estimation/compensation processor 720 can perform the processing including using adaptive cropping, if applicable.

Still referring to FIG. 7, residual can be formed by subtracting the predictor from the input video. The residual can be received by the transform/quantization processor 725, which can perform transformation processing (e.g., discrete cosine transform (DCT)) to produce coefficients, which can be quantized. The quantized coefficients and any associated signaling information can be provided to the entropy coding processor 745 for entropy encoding and inclusion in the output bit stream 750. The entropy encoding processor 745 can support encoding of signaling information related to encoding the current block. In addition, the quantized coefficients can be provided to the inverse quantization/inverse transformation processor 730, which can reproduce pixels, which can be combined with the predictor and processed by the in loop filter 735, the output of which is stored in the decoded picture buffer 740 for use by the motion estimation/compensation processor 720 that is capable of adaptive cropping.

With continued reference to FIG. 7, although a few variations have been described in detail above, other modifications or additions are possible. For example, in some implementations, current blocks can include any symmetric blocks (8×8, 16×16, 32×32, 64×64, 128×128, and the like) as well as any asymmetric block (8×4, 16×8, and the like).

Still referring to FIG. 7, in some implementations, a quadtree plus binary decision tree (QTBT) can be implemented. In QTBT, at the Coding Tree Unit level, the partition parameters of QTBT are dynamically derived to adapt to the local characteristics without transmitting any overhead. Subsequently, at the Coding Unit level, a joint-classifier decision tree structure can eliminate unnecessary iterations and control the risk of false prediction. In some implementations, LTR frame block update mode can be available as an additional option available at every leaf node of the QTBT.

In some implementations, and with continued reference to FIG. 7, additional syntax elements can be signaled at different hierarchy levels of the bit stream. For example, a flag can be enabled for an entire sequence by including an enable flag coded in a Sequence Parameter Set (SPS). Further, a CTU flag can be coded at the coding tree unit (CTU) level.

Still referring to FIG. 7, encoder 700 may include circuitry configured to implement any operations as described above in any order and with any degree of repetition. For instance, encoder 700 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 700 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 7, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which can be special or general purpose, coupled to receive data and instructions from, and to transmit data and instructions to, a storage system, at least one input device, and at least one output device.

Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
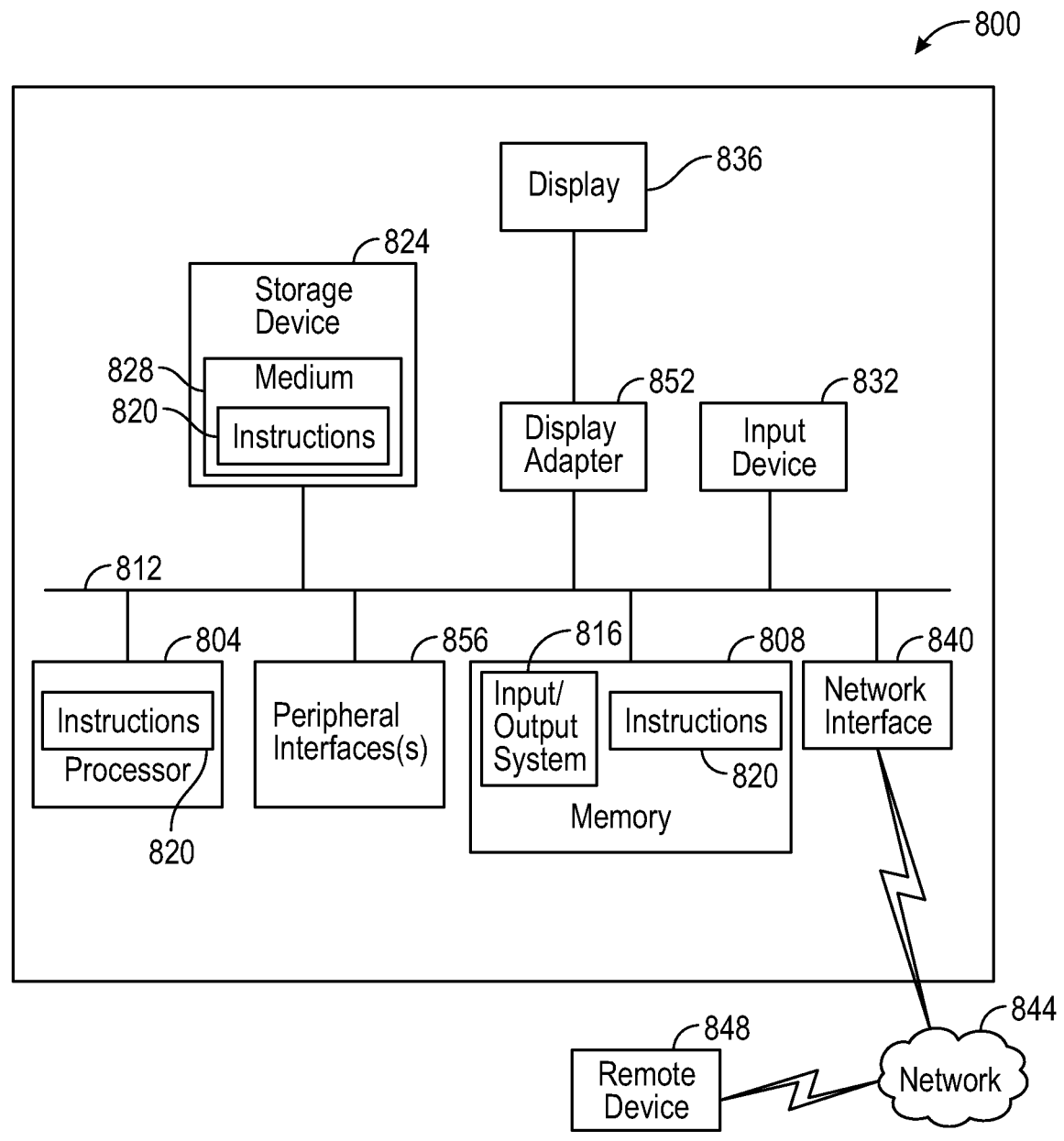
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

It is to be noted that any one or more of the aspects and embodiments described herein may be conveniently implemented using one or more machines (e.g., one or more decoder and/or encoders that are utilized as a user decoder and/or encoder for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein.

Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A hybrid decoder for a video bitstream supporting a video component and a feature component, comprising:
   a demultiplexer, the demultiplexer receiving a hybrid bit stream and parsing the received bitstream into video components and feature components; the hybrid bitstream further comprising a plurality of segments, each segment comprising a plurality of components defining the feature and video components therein including a hybrid size component;
   a video decoder coupled to the demultiplexer and receiving the video components of the bitstream;
   a feature decoder coupled to the demultiplexer and receiving the feature components of the bitstream, the feature decoder being further coupled to the video decoder and selectively provides feature data thereto to facilitate video decoding;
   a machine model coupled to the feature decoder;
   the hybrid decoder having a first decoding mode determined by the decoder based on attributes of the bitstream for independently decoding the video components and feature components of the bitstream and a second decoding mode for decoding video components in the bitstream using, in part, feature components in the bitstream, wherein the decoding mode is determined at least in part by characteristics of the hybrid size component.

2. The hybrid decoder of claim 1, wherein the video components in the bitstream comprise residual data obtained by encoding the difference between feature data and input video data, and wherein the feature decoder provides feature data to the video decoder in the second decoding mode.

3. The hybrid decoder of claim 1, wherein each segment is separately decoded and the decoding mode is determined for each segment.

4. A hybrid encoder for generating a hybrid bitstream comprising:
   a preprocessor, the preprocessor receiving an input video stream and multiplexing the video stream for video processing and feature processing;
   a video encoder, the video encoder compressing and encoding the video content for human viewing for inclusion in the bitstream,
   a feature extractor, the feature extractor coupled to a machine model providing parameters for feature extraction for subsequent machine processing, the feature extractor being operatively coupled to the video encoder and selectively providing feature data thereto;
   a feature encoder receiving feature data from the feature extractor and encoding said feature data for inclusion in a hybrid bitstream;
   an optimizer coupled to the video encoder and the feature encoder, the optimizer further encoding the video and feature data for inclusion in the bitstream; and
   a multiplexer, the multiplexer being coupled to the video encoder and feature encoder and generating a hybrid bitstream therefrom.

5. The hybrid encoder of claim 4, wherein the encoder operates in at least a first encoding mode for independently encoding the video components and feature components of the bitstream and a second encoding mode for encoding the video components in the bitstream using, in part, feature components from the feature encoder.

6. The hybrid encoder of claim 5, wherein in the second encoding mode, the video encoder generates residual data by encoding the difference between feature data and input video data.

7. The hybrid encoder of claim 1, wherein the hybrid bitstream comprises plurality of hybrid bitstream segments, each bitstream segment comprising a plurality of components including:
   a hybrid size component;
   a metadata component;
   a feature header;
   a feature payload;
   a video header; and
   a video payload.

* * * * *